United States Patent Office 3,027,915
Patented Apr. 3, 1962

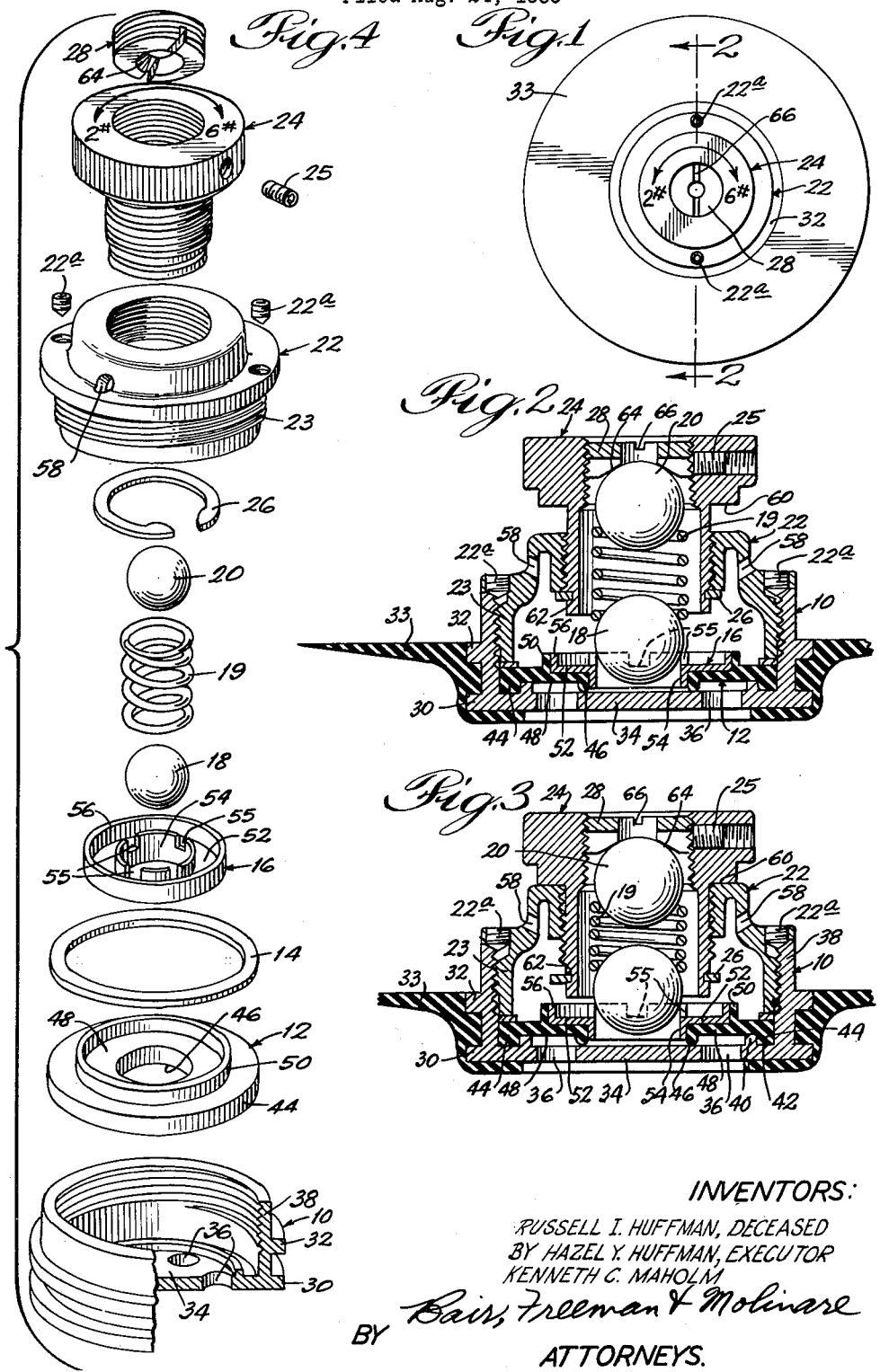

3,027,915
RELIEF VALVE FOR INFLATABLE DEVICES
Russell I. Huffman, deceased, late of Strasburg, Ohio, by Hazel Y. Huffman, executor, Strasburg, Ohio, and Kenneth C. Maholm, New Philadelphia, Ohio, assignors to Knapp-Monarch Company, St. Louis, Mo., a corporation of Delaware
Filed Aug. 24, 1959, Ser. No. 835,484
5 Claims. (Cl. 137—516.15)

This invention relates to a relief valve and more particularly to a venting relief valve which may be selectively set to vent at two different pre-selected pressures.

In gas-inflated devices it is frequently desirable to provide a relief valve to prevent obtaining of excessive pressures within the device which may cause the device to rupture. Where the inflatable device may be subject to varying external fluid pressures, in some instances it is desirable to provide for venting at different pre-selected pressures. A typical instance where a dual-pressure venting relief valve is desirable is for use with inflatable life jackets which may be worn by persons performing tasks under water, or which may be used for rescue of submariners whose craft may have become disabled.

When a person wearing an inflatable safety appliance is on, or adjacent, the surface of the water, the requisite pressure to keep the man afloat is 2 p.s.i. At atmospheric pressures, the danger point to avoid rupturing of the appliance may, for example, be 5 p.s.i.

But when a person is at a depth of about 50 feet below the surface of the water, and when it is necessary to inflate the appliance, a gas pressure in the appliance of 2 p.s.i. will be insufficient to bring the man to the surface because of the water pressure. The pressure requirements under these conditions is 6 p.s.i. gas pressure within the inflatable device in order to bring the man to the surface, and the water pressures keep the device from rupturing under such high gas pressure. But, once at the surface, the requisite internal pressure is only 2 p.s.i.

While devices similar to that disclosed herein have heretofore been proposed which use a pair of springs to pre-set the two principal pressures at which such relief valves are designed to operate, an important improvement in the development herein is the use of only a single spring to effect setting of the two principal pressures at which the relief valve is designed to operate. Thus, the instant application constitutes an improvement over the device disclosed in the co-pending application of Russell I. Huffman, Serial No. 835,485, which is assigned to the assignee of this application.

Thus, one object of this invention is to provide an improved relief valve for venting gas-inflated devices at two different pre-selected pressures, whereby the relief valve may be selectively set for venting at a relatively low-pressure condition within the inflated device when the device is subject to relatively low external pressures and whereby the relief valve may be selectively set for venting at a relatively high-pressure condition within the inflated device when the device is subject to relatively high external pressures, and wherein only a single spring is utilized to effect setting of the two principal pressures at which this relief valve is designed to operate.

A further object of this invention is to provide a selectively variable, pressure-venting, relief valve which is characterized by certain novel and simplified features of construction and by their effectiveness of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a top plan view of a valve embodying the invention disclosed herein;

FIGURE 2 is a cross-section view taken on line 2—2 of FIGURE 1 and shows the manual control member in a position wherein the valve vents at a pre-selected, relatively low pressure;

FIGURE 3 is similar to FIGURE 2 but shows the manual control member in a second position wherein the valve is pre-set to vent at a pre-selected, relatively high pressure; and FIGURE 4 is a perspective, exploded, view of the valve of FIGURES 2 and 3, showing the various parts of said valve.

Referring now to the drawings, there is shown a dual-pressure venting relief valve which includes (as best seen in the exploded view of FIGURE 4) a body generally indicated at 10, a flexible and resilient diaphragm 12, a sealing ring or washer 14, a diaphragm insert 16, a first ball 18, a spring 19, a second ball 20, a cap 22, a pair of set screws 22a, a manually adjusting screw member 24, a set screw 25, a split retaining ring 26, and a ball-engaging adjustment insert 28.

More particularly, the body 10 is formed with a pair of outwardly extending annular flanges 30 and 32, arranged for anchoring cooperation with a patch member 33, to which is adapted for securement to an inflatable appliance to which the valve is to be connected, as is presently well known in the art. The body 10 is also shaped to define an apertured valve plate 34, wherein a plurality of apertures 36 therethrough are arranged within an annular area of the valve plate. The body 10 is further shaped and arranged to define a sleeve 38, which is located outwardly of the annular area in which is disposed the apertures 36, and the inner periphery of the extended end of the sleeve 38 is threaded. Provided on valve plate 34 is an annular boss, or rib, 40 located outwardly of the apertures 36, and spaced inwardly from the sleeve 38 so as to define an annular recess 42 between rib 40 and sleeve 38.

The diaphragm 12 is preformed to define an enlarged outer rim portion 44, which is shaped and arranged for snugly fitting into recess 42, and an enlarged inner circular rim, or rib, portion 46 that is arranged to be disposed inwardly of the apertures 36 in the valve plate 34. The enlarged circular rim portions 44 and 46 are interconnected by a relatively thin annuar web portion 48 which overlies the annular area in which is disposed the apertures 36 in valve plate 34, and a portion of said web 48 is adapted to flex in response to varying pressures applied thereto, so that the inner, peripheral, valving portion of the diaphragm 12, including the sealing rib 46, may move toward and away from the valve plate 34.

The washer 14 is positioned on the rear side of diaphragm 12 substantially in alignment with the enlarged outer rib portion 44. The cap 22 has a threaded sleeve portion 23 for cooperation with the threaded sleeve 38 on body 10, and an edge of cap 22, serving as part of a retaining ring means, is arranged to engage sealing washer 14 to effect clamping and retention of the diaphragm 12 against valve plate 34 in the position seen in FIGURES 2 and 3, and to effect a sealing between the parts. The diaphragm 12 has an annular centering flange 50 thereon extending from web portion 48 oppositely relative to the projection of enlarged ribs 40 and 46 from web 48 of the diaphragm.

The diaphragm insert 16 includes a rigid annular backing plate portion 52 adapted to engage the back side of a portion of the diaphragm web 48 which is located radially inwardly of centering flange 50. The diaphragm insert 16 includes an inner sleeve, or ring, portion 54 disposed concentrically of the central aperture of the diaphragm 12 and inwardly of rim portion 46, and an outer sleeve, or flange, portion 56, which is located adjacent and concentrically inwardly of the centering flange 50. The concentric sleeves and flanges coperate to align the insert 16 on diaphragm 12. The rearward edge of sleeve 54 is provided with a plurality of venting notches 55, the purpose of which will become apparent hereinafter.

The cap 22 is an annular part having a central threaded aperture, and being formed with a plurality of venting apertures 58 therethrough. The manual adjustment, or control, member 24 is an elongated annular part that is screw-threaded in the central aperture of cap 22 and is adapted for movement toward and away from the diaphragm 12. An upper portion of the central aperture of the annular control member 24 is threaded to adjustably receive therein the insert 28.

The manual control member 24 is shaped to define an annular shoulder, or stop, 60 which is adapted to abut a portion of cap 22 when the control member 24 is in one extreme position, as shown in FIGURE 3. The control member 24 is also provided with a groove 62 for receiving therein the split retaining ring 26, which serves as a stop for engaging another portion of cap 22 when the control member 24 is in its other extreme position, as shown in FIGURE 2.

The balls 18 and 20 are preferably of the same size, and are spaced from each other and in engagement with the ends of the helical spring 19, as shown in FIGURES 2 and 3. The lower ball 18 is positioned to be operatively coupled to the diaphragm means which includes diaphragm 12 and insert 16, and the upper ball is operatively coupled to the manual control 24 through means including insert 28. The ball 18 is of larger dimension than the inner dimension of sleeve 54, so that the ball 18 is adapted to seat on the upper edge of sleeve 54, with a portion of the ball 18 extending into sleeve 54. The axial dimension of sleeve 54 and ball 18 are related so that the ball 18 is always spaced from the valve plate 34. The notches 55 in sleeve 54 provide means for venting past ball 18.

The inner dimension of helical spring 19 is smaller than the maximum dimension of the balls, so that when assembled, the spring 19 is maintained in position between the balls 18 and 20, with portions of said balls entering axially of the spring. The ball 20 abuts the under side of insert 28, said insert being provided with inclined frusto-conical walls 64, thereby providing a centering seat for the ball 20. The upper side of insert 28 is provided with a screw driver slot 66 for effecting adjustment of the position of the insert 28, so as to vary the forces obtained by the spring means.

In the position shown in FIGURE 2, the balls 18 and 20 are spaced from each other so that the spring 19 is compressed only an amount sufficient to deliver a first biasing force to the diaphragm 12, where at least a first pre-selected, relatively low pressure, for example—2 p.s.i., is required to be impressed on diaphragm 12 in order to achieve venting of excess pressure from the interior of the appliance to which the vent valve is attached.

When the parts are in the position shown in FIGURE 3, the spring 19 has been compressed a sufficient amount so as to impose a second bias force on the diaphragm 12 which requires at least a pre-selected, relatively high pressure, for example—6 p.s.i., against diaphragm 12 in order to effect unseating of the diaphragm from the valve plate 34, and to provide venting from the valve.

It will be understood that the length and spring constant of spring 19 is selected so that when it is compressed as shown in FIGURE 2 it delivers the requisite first biasing force to diaphragm 12 and when it is compressed as shown in FIGURE 3 it will deliver the requisite second biasing force to diaphragm 12. In the position of FIGURE 2, it will be seen that a portion of ball 18 still projects axially within the lowermost portion of the annular control member 24, and this arrangement maintains the spring 19 and the balls in alignment and prevents inadvertent dislocation of the parts within the valve. It will be seen that, in the position of FIGURE 3, the lowermost edge of adjustment control 24 is spaced from the diaphragm 12 to permit of the necessary movement of the diaphragm to achieve venting, and in said position, the balls 18 and 20, while closely adjacent each other, are nevertheless spaced so that there is no locking of the valve.

When the gas pressure within the appliance exceeds the bias force imposed upon the diaphragm 12, the excess pressure is vented past the sealing rib 46, through the central aperture of diaphragm 12, through the sleeve 54 and notches 55, and through venting apertures 58 to the exterior of the valve.

The set screw 22a cooperates between cap 22 and body 10 to lock those parts relative to each other, after an adjustment has been made at the factory. The insert 28 provides means for effecting a final adjustment of the spring means at a factory, and then the adjustment insert 28 may be locked in the factory pre-set position by means of set screw 25, carried by control member 24 and arranged to engage and lock insert 28 in position. The peripheral edge of control member 24 is knurled to assist in effecting movement of the control member 24 between the positions of FIGURES 2 and 3. The outer surface control member 24 is provided with indicia thereon, as seen in FIGURE 1, for indicating the direction of movement of the control member 24 required to achieve setting of the valve for venting at the selected relatively low and high pressures which are indicated thereon.

Thus, there is provided by what is disclosed herein a dual-pressure valve having an adjustment member which, when in one position, permits a venting operation at a relatively low selected pressure, and, when in another position, permits a venting operation at a relatively high predetermined pressure, and both pressures are achieved by a simplified construction which utilizes but a single spring in the bias control means therefor.

While there has been shown and described a particular embodiment of this invention, it will be obvious to those skilled in the art that various changes and modifications may be made therein without departing from the invention and, therefore, it is intended to cover all such changes and modifications as fall within the true spirit and scope of the invention.

What we claim as new, and desire to secure by Letters Patent of the United States, is:

1. A venting, dual-pressure relief valve comprising, in combination, a valve plate having aperture means therethrough arranged within an annular area, annular diaphragm means including a flexible annular diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, a movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a pair of spaced balls engaging and partially entering the ends of an elongated coil spring, one of said balls abutting spaced portions of the central opening in said diaphragm means to leave flow space between said one ball and said diaphragm means and the other said ball being operatively coupled to said manual control, and the constant of said spring being selected so that when said manual control is in its first position the first force is impressed on said diaphragm means, and when said manual control is in its second position the second force is impressed on said diaphragm means.

2. A venting, dual-pressure relief valve comprising, in combination, a valve plate having aperture means therethrough arranged within an annular area, annular diaphragm means including a flexible annular diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, a movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a pair of spaced balls engaging and partially entering the ends of an elongated coil spring, one of said balls abutting spaced portions of the central opening in said diaphragm means to leave flow space between said one ball and said diaphragm means and the other said ball being operatively coupled to said manual control, and the constant of said spring being selected so that when said manual control is in its first position the first force is impressed on said diaphragm means, and when said manual control is in its second position the second force is impressed on said diaphragm means, and said spring being of a length and said balls being of a size such that said balls are spaced from each other for all positions of said manual control.

3. A venting, dual-pressure relief valve comprising, in combination, a valve plate having aperture means therethrough arranged within an annular area, annular diaphragm means including a flexible annular diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biassing said diaphragm means toward said valve plate, a movable manual control associated with said spring means, said manual control and spring means being arranged so that when the canual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a pair of spaced balls engaging and partially entering the ends of an elongated coil spring, said diaphragm means including an annular rigid backing plate engaging said flexible diaphragm and movable therewith, a sleeve on said backing plate projecting away from said valve plate, one of said balls engaging spaced portions of the central opening of said sleeve to leave flow space between said ball and the remainder of said sleeve and partially entering said sleeve to effect operative engagement with said diaphragm means, and the other said ball being operatively coupled to said manual control.

4. A venting, dual-pressure relief valve comprising, in combination, a valve plate having aperture means therethrough arranged within an annular area, annular diaphragm means including a flexible diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means, located inwardly of said apertured area of said valve plate, arranged to move toward and away from said valve plate in response to variations in force applied to said diaphragm means, spring means normally biasing said diaphragm means toward said valve plate, a movable manual control associated with said spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a pair of spaced balls engaging and partially entering the ends of an elongated coil spring, said diaphragm means including an annular rigid backing plate engaging said flexible diaphragm and movable therewith, a sleeve on said backing plate projecting away from said valve plate, one of said balls engaging and partially entering said sleeve to effect operative engagement with said diaphragm means, and the other said ball being operatively coupled to said manual control, said sleeve being notched at its ball engaging end to provide vent passageways past said ball.

5. A venting, dual-pressure relief valve comprising, in combination, a valve plate having aperture means therethrough arranged within an annular area, annular diaphragm means including a flexible diaphragm member overlying said apertured annular area of said valve plate, retaining means clamping an outer peripheral portion of said flexible diaphragm, located outwardly of said apertured area of said valve plate, against said valve plate to effect a seal, there being an inner peripheral valving portion of said diaphragm means located inwardly of said apertured area of said valve plate, arranged to move toward and away from said valve plate in response to variations in force applied to said diaphragm means, spring means normally biasing said diaphragm means toward said valve plate, a movable manual control associated with sid spring means, said manual control and spring means being arranged so that when the manual control is in a first position there is impressed a first force against said diaphragm means, whereby a first pressure on said diaphragm means is required to effect venting of said valve, and when said manual control is in a second position there is impressed a second force against said diaphragm means, whereby a second pressure on said diaphragm means is required to effect venting of said valve, said spring means including a pair of spaced balls engaging and partially entering the ends of an elongated coil spring, said diaphragm means including an annular rigid backing plate engaging said flexible diaphragm and movable therewith, a sleeve on said backing plate projecting away from said valve plate, one of said balls engaging and partially entering said sleeve to effect operative engagement with said diaphragm means, and the other said ball being operatively coupled to said manual control, said sleeve being notched at its ball engaging end to provide vent passageways past said ball, and the constant of said spring being selected so that when said manual control is in its first position the first force is impressed on said diaphragm means, and when said manual control is in its second position the second force is impressed on said diaphragm means, said spring being of a length and said balls being of a size such that said balls are spaced from each other for all positions of said manual control.

References Cited in the file of this patent

UNITED STATES PATENTS

| | | |
|---|---|---|
| 575,451 | Yost | Jan. 19, 1897 |
| 2,052,098 | Lockett | Aug. 25, 1936 |
| 2,508,403 | Knauss | May 23, 1950 |
| 2,854,996 | Hughes | Oct. 7, 1958 |

FOREIGN PATENTS

| | | |
|---|---|---|
| 899,929 | France | Sept. 11, 1944 |
| 760,066 | Germany | Jan. 29, 1951 |
| 823,382 | Germany | Dec. 3, 1951 |